Oct. 1, 1957    R. A. MAYNE    2,807,883
SURFACE PLATE
Filed Feb. 17, 1954
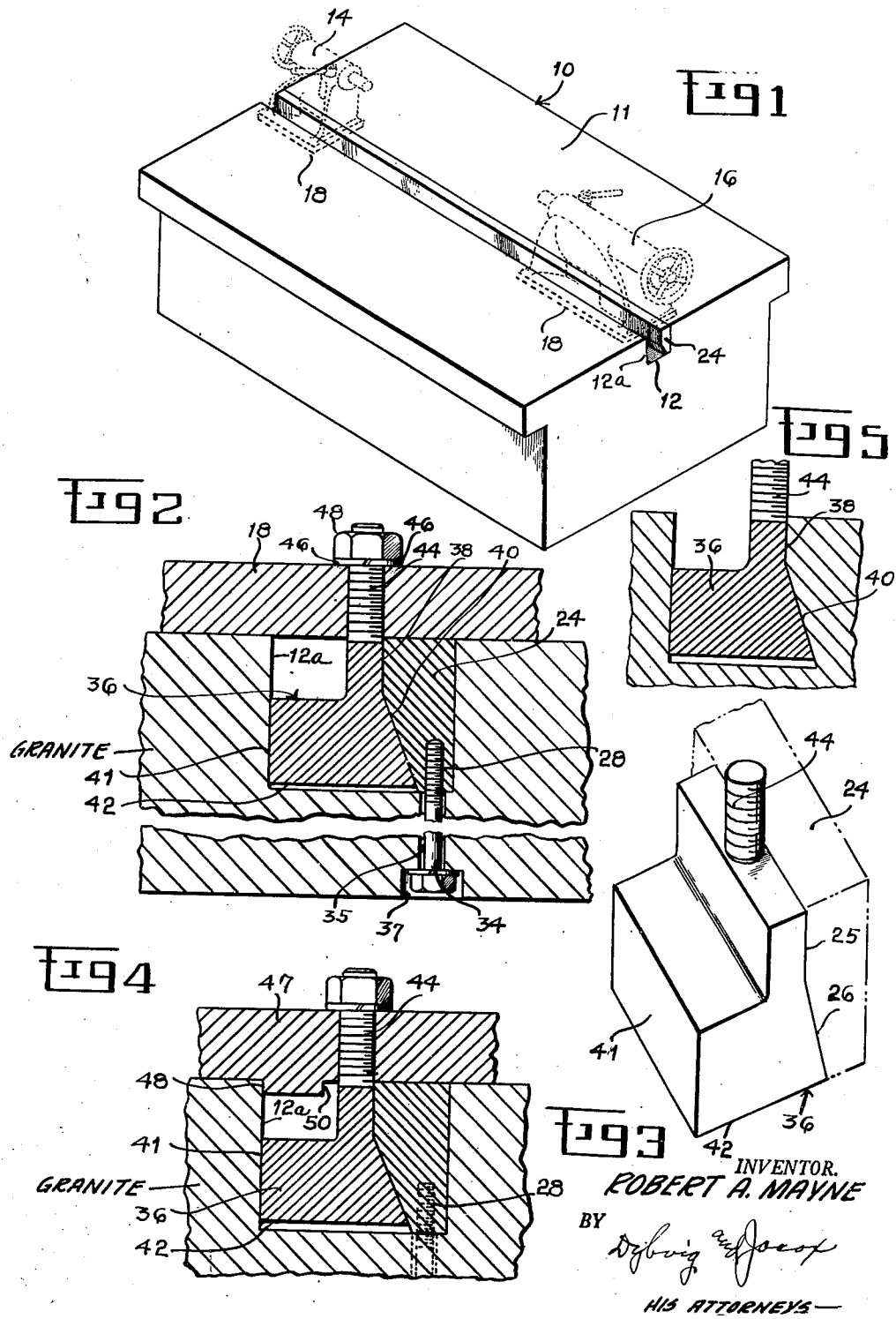
INVENTOR.
ROBERT A. MAYNE
BY
HIS ATTORNEYS—

United States Patent Office 2,807,883
Patented Oct. 1, 1957

2,807,883

SURFACE PLATE

Robert A. Mayne, Dayton, Ohio

Application February 17, 1954, Serial No. 410,916

2 Claims. (Cl. 33—174)

This invention relates to surface plates, and more particularly to improvements in the means now available for attaching implements to it for securing accuracies of a very high order.

In the use of surface plates, a rectangular slot is usually cut in the upper side of the plate, and instruments are attached to it. In the device disclosed herein this slot is usually sawed in the granite, and careful tooling makes possible high accuracy. However, in precision inspection procedures, accuracies as high as .0001 to .0002 are necessary in routine work, and in special assignments often even greater accuracies are necessary.

The object of the present invention is the provision of equipment for stone surface plates, such as granite surface plates, now in use for securing accuracies of a very high order. A further object of the invention is the provision of adjusting means in the slot of a stone surface plate so that great accuracies in the realm of .00005 may be obtained.

Other objects and advantages reside in the construction of parts, the combination thereof and the mode of operation, as will become more apparent from the following description.

In the drawing:

Figure 1 is a perspective view of a granite surface plate showing in dotted lines instruments attached to it.

Figure 2 shows a cross section taken through the adjusting device, with portions of the surface plate broken away so that both the top surface and the bottom surface can be shown.

Figure 3 is a detail in perspective of a retaining block and screw, showing a portion of the device in dotted lines.

Figure 4 is a cross section of the device shown attaching a shouldered anchor plate of an instrument to the surface plate.

Figure 5 is a modification, showing the slanted surface cut in the granite of the surface plate itself.

Referring more in detail to the drawings:

A stone surface plate 10 is provided with a work surface 11 having a slot or groove 12 for attachment of tools and instruments. The slot is rectangular in cross section and parallel to the edges of the surface plate. One wall of the slot is perpendicular to the working surface of the surface plate, and is trued to a high degree of accuracy so as to be perfectly straight. All other placements are made with reference to it. For the purpose of illustration, Figure 1 discloses a headstock 14 and a tail stock 16 shown in dotted lines.

An anchor plate for an instrument is shown at 18, in Figures 2 and 3, and an anchor plate 20, having a shoulder 22 on its under surface, is shown in Figure 4. Any instrumentality with or without an anchor plate can be attached to the surface plate by means of the device of this invention.

A highly tempered steel bar 24 is inserted in the slot 12 and may extend throughout its length. While steel has been specified, it is to be understood that this invention is not limited to a specific material. Other metals and certain plastics can also be used. The bar 24 may be considered as rectangular in cross section with a portion of the surface presented to the area of the slot cut back to provide a slanting surface 26 forming a tapered portion which surface is angular both to the perpendicular and to the horizontal.

The bar 24 is provided with internally screw threaded orifices 28 receiving attaching bolts 34, for securing the bar 24 in fixed position at one side of the groove 12. Openings 35 are drilled through the granite for the insertion of the bolts 34, and countersunk portions 37 are provided in the lower surface of the plate for the heads of the bolts 34.

A block 36 is insertable into the slot 12, and presents surfaces 38 and 40 which are complementary to the surfaces 25 and 26 of the bar 24. The opposite and under surfaces 41 and 42 respectively of the block 36 are right angularly disposed and fit side and base surfaces of the slot 12. The block 36 carries a perpendicularly extending retaining bolt 44 which is screw threaded and adapted to be inserted through openings in anchor plates 18 of instruments such as are shown in Figure 1 in dotted lines.

A washer 46 may be provided if desired. The nut 48 engages the bolt 44 for effecting delicate adjustments of the device. The block 36 is movable upwardly and downwardly and when so moved the anchor plate is moved laterally in either direction as desired.

The bar 24 is accurately machined, although it need not be finished to the high degree of accuracy of the finish of the vertical surface or wall 12a of the groove or slot 12. Due to the taper of the lower portion of the bar 24 and the inclined surface of member 26, it can readily be seen that the block 36 is aligned with the vertical wall 12a. That being the case, the alignment of the block will not be altered by irregularities that may be found in the bar 24. Furthermore, as is well known to those skilled in the art, metallic members, especially long, slender, metallic members, have a tendency to warp as they age, due to various causes, such as internal stresses, temperature changes, et cetera. By utilizing the wall 12a as an aligning wall, the warping of the bar 24 or expansion and contraction thereof, will not cause misalignment of the member carried and held in position by the screw 44.

It has been found that granite is not susceptible to changes caused by aging, in that the granite has aged over eons of time and is therefore fully cured. That being the case, the finished surface 12a, as well as the finished top surface of the surface plate, remains constant over long periods of use without any changes other than those caused by wear, which are very small, due to the hardness of the rock used.

In the modification shown in Figure 4 the anchor plate 47 has a definite starting point and is movable in one direction only. The shoulder 48 on the undersurface of the anchor plate abuts the side of the slot, and movement to the right only as shown in Figure 4 is allowed. The shoulder 48 is used to align the plate and whatever instrumentality is mounted thereon. The shoulder 48 engaging the side wall 12a is accurately aligned thereby.

In the modification shown in Figure 5, a portion of one of the side walls of the slot 12 is cut at an angle to the perpendicular and form surfaces 52 and 54 so that the wall of the slot itself is complementary to the surfaces 38 and 40 of the block 36. The same result is obtained without the intervening bar 24.

In this modification both side walls of the slot or groove may be precision ground, lapped or finished and always remain the same, excepting for normal wear, which in most cases may be completely ignored as inconsequential.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A stone surface plate provided with a work surface, an instrument anchoring plate, means for attaching said anchoring plate to said surface plate for accurately positioning said anchoring plate, said means comprising a groove in said surface plate and holes extending downwardly from the bottom of the groove to the under side of the surface plate, said groove having opposite walls thereof perpendicular to said work surface, a metallic bar and a block disposed within said groove, said bar being rigidly attached by bolts extending from the under side of the surface plate through the holes in said surface plate so as to attach said metallic bar along one wall of said groove and against the bottom of the groove, said bar and said block having diagonally disposed complementary surfaces engaging each other to form a wedge, and means on said block for actuating said block to wedge said block against said perpendicular wall of the groove and to secure minutely accurate positioning of said anchoring plate.

2. A stone surface plate, said surface plate having a slot extending across the top thereof, the sides of the slot being perpendicular to the work surface of the plate, and holes extending from the bottom of the slot to the under side of the surface plate, a metallic bar extending longitudinally within said slot, bolts extending through said holes for rigidly fastening the metallic bar within the slot and along one side thereof, said bar presenting a surface diagonally disposed with respect to the remaining area of said slot, a block also disposed in said slot and presenting a diagonal surface complementary to and forming a wedge with the first mentioned diagonal surface, and screw means on said block for actuating said wedge to wedge said block against said perpendicular surface and affecting minutely accurate positioning of said block.

References Cited in the file of this patent

UNITED STATES PATENTS

| | | |
|---|---|---|
| 1,527,791 | Flanders | Feb. 24, 1925 |
| 1,858,898 | Mesker | May 17, 1932 |
| 1,903,865 | Johnson | Apr. 18, 1933 |
| 1,930,273 | Hutchinson | Oct. 10, 1933 |
| 2,187,854 | Hallenbeck | Jan. 23, 1940 |
| 2,214,983 | Zuckerman | Sept. 17, 1940 |
| 2,340,450 | Bouschor | Feb. 1, 1944 |
| 2,410,877 | Hall | Nov. 12, 1946 |
| 2,501,148 | Weis | Mar. 21, 1950 |
| 2,601,630 | Rahn | June 24, 1952 |
| 2,659,158 | Cobb | Nov. 17, 1953 |